3,141,906
PROCESS FOR PREPARING TETRAKIS
(DIMETHYLAMINO) ETHYLENE
William J. Chambers, Claymont, Del., assignor to E. I. du Pont de Nemours and Company, Wilmington, Del., a corporation of Delaware
No Drawing. Filed Feb. 13, 1963, Ser. No. 258,170
14 Claims. (Cl. 260—583)

This invention relates to a new process for the preparation of tetrakis(dimethylamino)ethylene. In particular, it relates to, and has as its principal object provision of, the novel preparation of tetrakis(dimethylamino)ethylene by the catalyzed pyrolysis of a bis(dimethylamino)-hydrocarbyloxymethane in the presence of a Lewis acid.

Tetrakis(dimethylamino)ethylene is an old compound of interesting chemical and physical properties. It was first reported by Pruett et al., J. Am. Chem. Soc., 72, 3646 (1950). The method of preparation there given involved reaction between dimethylamine and chlorotrifluoroethylene. While this method proceeded satisfactorily, it involves relatively high synthesis cost because of the current relatively high price of the necessary chlorotrifluoroethylene intermediate.

It has now been discovered that tetrakis(dimethylamino)ethylene can be prepared quite readily and cheaply by the Lewis acid-catalyzed pyrolysis of the bis(dimethylamino)hydrocarbyloxymethanes. These latter compounds can be prepared easily and relatively cheaply in the manner of Bredereck et al. Angew. Chemie, 74, 353 (1962), using as necessary ingredients the relatively inexpensive and easily commercially available dimethylformamide, dimethyl sulfate, dimethylamine, and the requisite sodium or other alkali metal hydrocarbyl oxide, all in accord with the following stoichiometry:

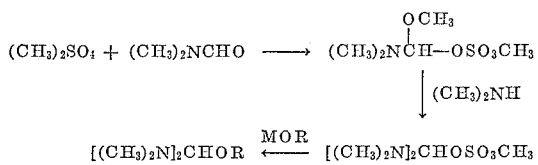

wherein M is used to represent an alkali metal, generally of atomic number from 3 to 55, inclusive, and preferably of atomic number 11 to 19, inclusive; and R is used to represent a monovalent hydrocarbyl radical free of aliphatic unsaturation and generally of no more than 12 carbons and expressly inclusive of the monovalent alkyl, aryl, aralkyl, alkaryl, and cycloalkyl hydrocarbon radicals of no more than 12 carbons each and preferably of no more than eight carbons each. These bis(dimethylamino)hydrocarbyloxymethanes can be directly and easily converted by Lewis acid-catalyzed pyrolysis to the desired tetrakis(dimethylamino)ethylene in accord with the following stoichiometry:

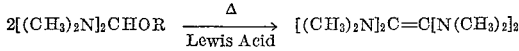

The following examples, in which the parts given are by weight, are submitted to further illustrate but not to limit the invention.

EXAMPLE I

A hot tube reactor assembly was prepared comprising a heated still pot and vertically attached thereto a ¾" x 16" glass column, packed with approximately ¼" x ¼" cylinders of a commercially available high silica glass and fitted with a center entry port, and at the top a water-cooled condenser unit to remove low boilers. The pot was heated via an external bath at 160° C. The tube temperature was maintained in the range 187–210° C. at atmospheric pressure, and 11.3 parts of bis(dimethylamino)methoxymethane containing 0.5 part of p-toluenesulfonic acid catalyst was passed into the hot tube via the center entry over a period of 50 minutes. The pot residue was analyzed by vapor-phase chromatography (VPC) and found to contain 1.03 parts of tetrakis(dimethylamino)ethylene representing a 6% yield.

EXAMPLE II

A still pot was charged with 13.2 parts of bis(dimethylamino)methoxymethane, 13.7 parts (an equimolar proportion based on bis(dimethylamino)methoxymethane) of bis(dimethylamino)chloromethane as catalyst, and about 17.5 parts of toluene. The resulting mixture was then fractionated by distillation through a 35 cm. x 0.5 cm. glass column packed with a commercially available 0.05" x 0.1" x 0.1" wound wire column packing, said wire being fabricated from a commercially available, corrosion-resistant alloy known to the trade as "Hastelloy B," by slowly increasing the temperature of an external heating bath on the pot from 120 to 169° C. with corresponding reduction in pressure to give the following fractions:

| Fraction | Boiling Point, ° C./mm. | Parts by Volume |
|---|---|---|
| A | 90–106/760 | 16 |
| B | 106–116/760 | 11.5 |
| C | 43–82/25 | 6.7 |

Fraction C separated into two layers and the top layer was taken. This weighed 2.6 parts and on analysis by VPC was found to be 76% pure tetrakis(dimethylamino)ethylene. This corresponds to a 20% conversion based on the charged bis(dimethylamino)methoxymethane.

EXAMPLE III

Example II was repeated using 66.6 parts of bis(dimethylamino)methoxymethane, 13.7 parts (0.2 molar proportion based on bis(dimethylamino)methoxymethane) of bis(dimethylamino)chloromethane catalyst, and about 43.3 parts of toluene. The charge was heated to the reflux, and distillate was removed at atmospheric pressure over a 15-hour period. A total of 72 parts by volume of products, boiling from 77 to 89° C. at atmospheric pressure, was obtained at inside pot temperatures gradually rising from 88 to 137° C. The residue was fractionated under reduced pressure (25 mm. of mercury) to afford the following six fractions:

| Fraction | Boiling Point, ° C./mm. | Parts by Volume |
|---|---|---|
| A | 25–44/25 | 20.5 |
| B | 42–47/25 | 8.4 |
| C | 47–57/25 | 3.0 |
| D | 57.5/25 | 6.2 |
| E | 57.5–89/25 | 4.9 |
| F | 89–96/25 | 15.4 |

Fractions D and E each separated into two layers and Fraction F was taken as substantially all tetrakis(dimethylamino)ethylene. The top layers of Fractions D and E were combined with Fraction F to give 15.9 parts of 93 mole percent pure tetrakis(dimethylamino)ethylene as shown by VPC, which corresponds to a 30% conversion based on the bis(dimethylamino)methoxymethane charged. The distillate, other than the above isolated tetrakis(dimethylamino)ethylene, was recycled by the same procedure and afforded an additional 2.69 parts of 76 mole percent pure tetrakis(dimethylamine)ethylene, making the total conversion 35% of theory.

EXAMPLE IV

In the manner of Bredereck et al., Angewandte Chemie 74, 353 (1962), two molar proportions of dimethylformamide, dimethyl sulfate, and dimethylamine were reacted to form 424 parts of bis(dimethylamino)methylsulfatomethane. This was mixed with about 280 parts of diethyl ether and 108 parts of sodium methoxide. The reaction mixture was stirred at the reflux for five hours, the sodium methyl sulfate precipitate was removed by filtration, and the diethyl ether reaction medium was removed by distillation. The resultant 184 parts of crude bis(dimethylamino)methoxymethane was mixed with 13.7 parts of bis(dimethylamino)chloromethane catalyst and about 43.3 parts of toluene. This was fractionated through a distillation column as in the preceding example to afford 42.75 parts of tetrakis(dimethylamino)ethylene, representing a 21.3% conversion based on the initial dimethylformamide charged.

EXAMPLE V

Example III was repeated using 39.7 parts of bis(dimethylamino)methoxymethane, 0.5 part of a commercially available silica-alumina catalyst containing 13% $Al_2O_3$, and about 8.7 parts of dry toluene. The initial distillation was carried out until the temperature of the distillate reached 132° C. at atmospheric pressure. The final fractionation step of the residue was omitted, and the tetrakis-(dimethylamino)ethylene product was obtained by washing the residue with two five-part portions of deoxygenated water and removing the resulting separated top layers. These were combined to afford 3.69 parts of 92.2 mole percent pure tetrakis(dimethylamino)ethylene corresponding to an 11.3% conversion based on the bis(dimethylamino)methoxymethane charged.

EXAMPLE VI

Example IV was repeated on a four-mole scale, and the crude bis(dimethylamino)methoxymethane thus obtained was fractionated as described in Example IV using one part of bis(dimethylamino)chloromethane as catalyst. There was thus obtained 45.5 parts of 96.2 mole percent pure tetrakis(dimethylamino)ethylene, corresponding to a 10.9% conversion based on the dimethylformamide charged. There was also obtained 76 parts (14.4% of theory) of recovered bis(dimethylamino)methoxymethane.

EXAMPLE VII

Example III was repated using 39.96 parts of bis(dimethylamino)methoxymethane, 0.5 part of a commercially available 10% boric oxide-on-alumina catalyst, and 8.7 parts of toluene. The resulting 13.0-part pot residue contained 62.8% tetrakis(dimethylamino)ethylene as analyzed by VPC, representing a conversion of 27.2%.

EXAMPLE VIII

A mixture of 13.2 parts of bis(dimethylamino)methoxymethane, 0.66 part of bis(dimethylamino)chloromethane catalyst, and 4.3 parts of toluene was distilled through a 11 cm. x 1.2 cm. column packed with glass helices and fitted with a water condenser take-off. The pot was heated in an oil bath, the temperature of which was slowly raised from 138 to 166° C. over a period of 7.5 hours at atmospheric pressure. There was thus obtained 11.5 parts of distillate boiling over the range 47–126° C. and a 4.54-part pot residue which by VPC analysis was shown to be 60% tetrakis(dimethylamino)ethylene, representing a 27% conversion.

EXAMPLE IX

Example VIII was repeated substituting 0.66 part of a commercially available montmorillonite catalyst (Girdler KSF 7066A) for the bis(dimethylamino)chloromethane catalyst. There was thus obtained 9.59 parts of distillate boiling in the range 56–115° C. at atmospheric pressure and a 5.0-part pot residue which by VPC analysis was shown to contain 76.6% tetrakis(dimethylamino)ethylene, representing a conversion of 38%.

EXAMPLE X

Example VIII was repeated substituting 0.66 part of a commercially available alumina, acid, activity grade I catalyst for the bis(dimethylamino)chloromethane catalyst. There was thus obtained 11.75 parts of distillate boiling in the range 64–131° C. at atmospheric pressure and a 2.9-part pot residue which analyzed by VPC for 68% tetrakis(dimethylamino)ethylene, representing a conversion of 16.3%.

EXAMPLE XI

Example VIII was repeated substituting 0.66 part of polyphosphoric acid (ortho equivalent 115%) catalyst for the bis(dimethylamino)chloromethane catalyst and carrying out the distillation at temperatures ranging from 136 to 168° C. over a period of 16 hours. There was thus obtained a 3.95-part pot residue which by VPC analysis was shown to contain 74.2% tetrakis(dimethylamino)ethylene, representing a 29.2% conversion.

EXAMPLE XII

Example XI was repeated substituting 0.66 part of p-toluenesulfonic acid catalyst for the polyphosphoric acid catalyst. There was thus obtained a 2.48-part pot residue which by VPC analysis was shown to contain 42.5% tetrakis(dimethylamino)ethylene, representing a 10.5% conversion.

EXAMPLE XIII

Example XI was repeated substituting 0.55 part of a pyrophoric nickel molybdite catalyst for the polyphosphoric acid catalyst. There was thus obtained a 4.19-part pot residue which by VPC analysis was shown to contain 63.1% tetrakis(dimethylamino)ethylene, representing a 26.4% conversion.

EXAMPLE XIV

Example XI was repeated using 13.7 parts of bis(dimethylamino)methoxymethane, 4.3 parts of toluene, and 0.66 part of purified silica gel as catalyst in place of the polyphosphoric acid catalyst. Prior to charging the silica gel catalyst, it was heated for two hours at 190° C. in a dry stream of nitrogen. There was thus obtained a 4.96-part pot residue, which by VPC analysis was shown to contain 62.4% tetrakis(dimethylamino)ethylene equivalent to 3.09 parts of pure tetrakis(dimethylamino)-ethylene and representing a 30.9% conversion.

EXAMPLE XV

Example XIV was repeated substituting 0.13 part of sodium fluoborate for the silica gel catalyst. Prior to charging the fluoborate catalyst, it was heated for one hour at 190° C. under a stream of dry nitrogen. There was thus obtained a 7.7 part pot residue which was washed twice with 2 part portions of deoxygenated water. There was thus obtained 6.2 parts of 94.3 mole percent pure tetrakis(dimethylamino)ethylene as judged by VPC analysis corresponding to 5.9 parts of pure tetrakis(dimethylamino)ethylene representing a 59% conversion.

From the foregoing stoichiometry, it is apparent that the over-all reaction is an extremely smple one and that the requisite bis(dimethylamino)hydrocarbyloxymethanes can be readily prepared in quite high yields, based on the original starting materials. By varying the nature of the alkali metal hydrocarbyl oxide coreactant, the various bis(dimethylamino)hydrocarbyloxymethanes can be made. Thus, in the previously discussed stoichiometry by substitution of, for instance, lithium dodecyl oxide, there will be obtained the desired bis(dimethylamino)dodecyloxymethane. Similarly, by substituting potassium p-ethylphenoxide, there will be obtained the desired bis(dimethylamino)p-ethyl phenoxymethane. Similarly, by substituting rubidium β-phenylethoxide, there will be obtained the desired bis(dimethylamino)-β-phenylethoxymethane. Similarly, by substituting cesium cyclohexyl oxide, there will be obtained the desired bis(dimethylamino)cyclohexyloxymethane. Likewise, by suitable substitution of the necessary alkali metal hydrocarbyl oxides, i.e., the alkali metal salts of the desired hydrocarbyl alcohols and phenols, there will be obtained the desired bis(dimethylamino)hydrocarbyloxymethanes. The only variant involved in these necessary intermediates is the specific alkali metal and requisite hydrocarbyl alcohol and phenol used. As should be apparent from the stoichiometry, the alkali metal does not appear in the final product, but the hydrocarbyloxy moiety of the hydrocarbyl alcohol and phenol does appear as the oxy substituent on the bis-(dimethylamino)methane fragment.

As is apparent from the foregoing discussion and the specific fully detailed examples, the pyrolysis can be carried out quite simply and directly. Normally, temperatures of at least about 80° C. will be required and temperatures up to 200–300° C. can also be used, with reduced pressures being preferably also used in the higher temperature ranges. As is apparent, the lower boiling (with respect to the desired tetrakis(dimethylamino)-ethylene product) hydrocarbyl alcohol or phenol corresponding to the hydrocarbyloxy moiety of the bis(dimethylamino)hydrocarbyloxymethane intermediate is removed by distillation. Any type of distillation equipment can be used. Alternatively, as illustrated in the examples, the pyrolysis reaction can be carried out in a hot tube at elevated temperatures and more rapid throughput rates. An undesirable reaction to be minimized for in these higher temperature operations is reaction of the hydrocarbyl alcohol or phenol with the desired ethylene product.

While, as illustrated in these foregoing examples, the pyrolysis reaction can be carried out without any added solvent or diluent, it is generally preferred that an inert solvent or diluent be present. This material presumably serves only as a regulator for the heat transfer required, and any inert organic material, liquid at the pyrolysis temperatures being used, is suitable. Normally, the conventional inert organic solvents, liquid at room temperature, will be used. Of these, a particularly preferred class are the normally liquid aromatic hydrocarbons.

The major variant in the process is the catalyst which can be used in amounts ranging from a few percent of the bis(dimethylamino)hydrocarbyloxymethane to as high as equimolar proportions based thereon or higher— all as illustrated in the foregoing examples. Normally speaking, the catalyst will generally be used in amount from about 0.1–25% of the bis(dimethylamino)hydrocarbyloxymethane. Generically speaking, the catalysts for this pyrolysis reaction can best be described as Lewis acids. Lewis acids are well known to the chemical art, as first defined by G. N. Lewis in his classic paper in the J. Franklin Institute, 226, 293 (1938). Many continuing papers by Lewis and his coworkers, and by now many others in more recent chemistry, have confirmed this original Lewis concept of acid and base behavior, and have illustrated the true genus of Lewis acids with many specific subgeneric and species disclosures. A Lewis acid is, by definition a molecule, the structure or configuration of which, electronically speaking, is so arranged that the molecule is capable of accepting one or more electrons from a molecule which is capable of donating said electrons, i.e., has an electron-abundant structure. Many and varied electron acceptor compounds are known, including the well-known wholly inorganic type such as $AlCl_3$, $BF_3$, $ZnCl_2$, $HgClOCH_3$, mineral silicates and silicas, phosphates, and the like, either as such or supplied as a derivative or carried on one of the usual high surface area catalyst carriers, such as alumina and the like.

To list but a few additional Lewis acids of the well-recognized organo and organo-inorganic classes, there can be named the polycyano- and polynitro-substituted ethylenes carrying also a plurality of halogen or nitroso substituents, e.g.,

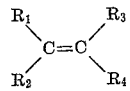

where $R_1=R_3$ and are pairwise CN or $NO_2$ and $R_2=R_4$ =CN, NO, or halogen;

the polycyano-, polyhalo-, or polynitro-substituted ortho-, i.e., 1,2-, aromatic quinones carrying, if desired, in addition to at least two cyano or two nitro ring substituents up to two hydrogens or nitroso substituents on ring carbon, e.g.,

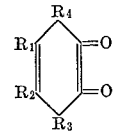

where $R_1=R_2=R_3=R_4=$CN or halogen, when any two are CN then the other two can be halogen or hydrogen or NO, and when $R_3=R_4=NO_2$, then $R_1$ and/or $R_2$ can be hydrogen, halogen, CN, or NO;

the polycyano, polyhalo, polynitroso, and polynitro para-, i.e., 1,4-, aromatic quinones, e.g.,

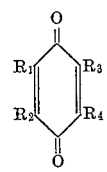

where $R_1=R_2=R_3=R_4=$CN or halogen, when $R_1=R_2$ =CN then $R_3$ and/or $R_4$ can be hydrogen, halogen, or NO, when $R_1=R_3=$CN or halogen then $R_2$ and $R_4$ can be NO or $NO_2$, and when $R_1=R_3=$CN then $R_2$ and $R_4$ can be halogen or hydrogen;

the 1,4-bis(dicyanomethylene)-2,5-cyclohexadienes carrying, if desired, one or more halogen, cyano, nitroso, or nitro substituents on the 2, 3, 5, and/or 6 ring carbons, e.g.,

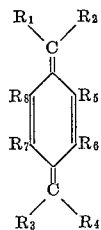

where $R_1=R_2=R_3=R_4=$CN and $R_5$ through $R_8=$hydrogen, halogen, CN, or NO, when $R_5=R_7=NO_2$ then $R_6=R_8=$hydrogen, and when $R_5=R=NO_2$ then $R_6=R_7$ =hydrogen;

the polycyano- and polynitro-substituted cyclobut-3-en-1,2-diones, e.g.,

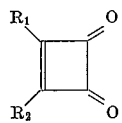

where $R_1=R_2=$CN or $NO_2$;

the polycyano-, polyhalo-, or polynitro-substituted polycyclic aromatic quinones, e.g., the 2,3-dicyano-1,4-naphthoquinones, carrying four halogens or two or more cyano substituents on the benzo ring, the polycyano- and polyhalo-substituted 9,10-anthraquinones, e.g., 9,10-anthraquinones carrying four halogen substituents or two or more cyano substituents on each benzo ring, the hexacyano-3,8- or -3,10-pyrenequinones; the polycyano-, polyhalo-, and/or polynitro-substituted polycyclic aromatic polyquinones, e.g., the hexacyano-3,10,4,9-perylenediquinones, e.g., 1,2,5,7,8,11-hexacyano-3,10,4,9-perylenediquinone; polynitro- and polynitroso-substituted aromatic hydrocarbons, and the like.

In all the foregoing instances the halogen substituents there discussed are expressly inclusive of all the four normal halogens running from atomic weight 19 through 85, i.e., fluorine, chlorine, bromine, and iodide. Likewise, in all the foregoing instances the molecular structure can also carry functional substituents. Preferred are the electronegative substituents which can be classed as those which, when present on ring carbon of an aromatic nucleus, tend to direct any entering substituent radical into the meta-position with respect to the said functional substituent, i.e., the so-called meta-orienting groups. These substituents also have been described by Price, Chem. Rev. 29, 58 (1941), in terms of the electrostatic polarizing force as measured in dynes of the said substituent groups on an adjacent double bond of the benzene nucleus. Quantitatively, any substituent exhibiting a polarizing force in dynes greater than 0.50 can be regarded as electronegative and meta-orienting and is preferred as a functional substituent on the Lewis acids here involved. These preferred substituents include sulfo, chloroformyl, trifluoromethyl, methylsulfonyl, carboxy, hydrocarbyloxycarbonyl, formyl, nitromethyl, and the like.

Suitable additional specific Lewis acids include such polycyanoethylenes as tetracyanoethylene; polycyanopolynitroso-substituted ethylenes such as 1,2-dicyano-1,2-dinitrosoethylene, which actually exists in the tautomeric ring form as dicyanofuroxan; polyhalo-substituted o-quinones such as fluoranil, i.e., tetrafluoro-o-quinone, chloranil, i.e., tetrachloro-o-quinone, bromanil, i.e., tetrabromo-o-quinone, iodanil, i.e., tetraiodo-o-quinone; polycyano-substituted quinones such as 2,3-dicyano-p-quinone; halocyano-substituted quinones such as 2-chloro-5,6-dicyano-1,4-benzoquinone; polyhalo-substituted polycyano-substituted quinones such as 2,3-dichloro-5,6-dicyano-1,4-benzoquinone; polycyano-substituted quinones such as 2,3,5,6-tetracyano-1,4-benzoquinone; 1,4-bis(dicyanomethylene)-2,5-cyclohexadienes and the polycyano-substituted derivatives thereof such as 7,7,8,8-tetracyanoquinodimethan and 2,3,5,6,7,7,8,8-octacyanoquinodimethan; polycyano-substituted cyclobutenones such as 2,3-dicyanocyclobuten-3-one; polyhalopolynitroquinones such as 2,5-dichloro-3,6-dinitro-1,4-benzoquinone; and polynitro- and nitroso-substituted aromatic hydrocarbons, e.g., hexanitrosobenzene; and the like.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing tetrakis(dimethylamino)-ethylene which comprises pyrolyzing, at a temperature in the range of about 80–300° C., a bis(dimethylamino)-hydrocarbyloxymethane of the formula $$[(CH_3)_2N]_2CHOR$$

wherein R is a monovalent hydrocarbyl radical of up to 12 carbons free of aliphatic unsaturation, in the presence of a Lewis acid.

2. The process of claim 1 wherein the Lewis acid is inorganic.

3. The process of claim 1 wherein the Lewis acid is organic.

4. The process of preparing tetrakis(dimethylamino)-ethylene which comprises pyrolyzing, at a temperature in the range of about 80–300° C., bis(dimethylamino)-methoxymethane in the presence of a Lewis acid.

5. The process of preparing tetrakis(dimethylamino)-ethylene which comprises pyrolyzing, at a temperature in the range of about 80–300° C., bis(dimethylamino)-methoxymethane in the presence of p-toluenesulfonic acid.

6. The process of preparing tetrakis(dimethylamino)-ethylene which comprises pyrolyzing, at a temperature in the range of about 80–300° C., bis(dimethylamino)-methoxymethane in the presence of bis(dimethylamino)-chloromethane.

7. The process of preparing tetrakis(dimethylamino)-ethylene which comprises pyrolyzing, at a temperature in the range of about 80–300° C., bis(dimethylamino)-methoxymethane in the presence of silica-alumina.

8. The process of preparing tetrakis(dimethylamino)-ethylene which comprises pyrolyzing, at a temperature in the range of about 80–300° C., bis(dimethylamino)-methoxymethane in the presence of boric oxide-on-alumina.

9. The process of preparing tetrakis(dimethylamino)-ethylene which comprises pyrolyzing, at a temperature in the range of about 80–300° C., bis(dimethylamino)-methoxymethane in the presence of montmorillonite.

10. The process of preparing tetrakis(dimethylamino)-ethylene which comprises pyrolyzing, at a temperature in the range of about 80–300° C., bis(dimethylamino)-methoxymethane in the presence of alumina.

11. The process of preparing tetrakis(dimethylamino)-ethylene which comprises pyrolyzing, at a temperature in the range of about 80–300° C., bis(dimethylamino)-methoxymethane in the presence of polyphosphoric acid.

12. The process of preparing tetrakis(dimethylamino)-ethylene which comprises pyrolyzing, at a temperature in the range of about 80–300° C., bis(dimethylamino)-methoxymethane in the presence of a molybdite.

13. The process of preparing tetrakis(dimethylamino)-ethylene which comprises pyrolyzing, at a temperature in the range of about 80–300° C., bis(dimethylamino)-methoxymethane in the presence of silica.

14. The process of preparing tetrakis(dimethylamino)-ethylene which comprises pyrolyzing, at a temperature in the range of about 80–300° C., bis(dimethylamino)-methoxymethane in the presence of a fluoborate.

No references cited.